Dec. 10, 1968  J. T. REDFERN  3,416,065
VARIABLE FREQUENCY OSCILLATOR FOR ALTERNATELY
SWITCHING ON HF GENERATORS
IN A POWER SYSTEM
Filed Oct. 31, 1966  2 Sheets-Sheet 1

INVENTOR.
JOHN T. REDFERN
BY
ATTORNEYS

INVENTOR.
JOHN T. REDFERN

United States Patent Office 3,416,065
Patented Dec. 10, 1968

3,416,065
VARIABLE FREQUENCY OSCILLATOR FOR ALTERNATELY SWITCHING ON HF GENERATORS IN A POWER SYSTEM
John T. Redfern, La Jolla, Calif., assignor to the United States of America as represented by the Secretary of the Navy
Filed Oct. 31, 1966, Ser. No. 591,385
2 Claims. (Cl. 321—61)

ABSTRACT OF THE DISCLOSURE

Two sets of rectifiers each convert primary AC power to DC. The two DC's are both applied to the load, but in opposite directions, and are alternately switched on. A variable frequency oscillator drives a flip flop, which alternately enables one of two HF generators. The generators enable, respectively, the two sets of rectifiers. Because of the high frequency of the two generators, no phase control nor synchronization is required.

---

The invention described herein may be manufactured and used by or for the Government of the United States of America for governmental purposes without the payment of any royalties thereon or therefor.

This invention relates to means for generating alternating current of variable frequency and high power, and is particularly directed to means for deriving the variable frequency from sources of power of commercial frequency.

Heretofore it has been customary to change commercial alternating current to direct current and then to change the direct current to alternating current of the desired frequency. The disadvantages of this roundabout technique is that it is inefficient in the several conversions. The technique requires cumbersome and expensive equipment. Rotary AC motor-generator sets are still in wide use.

The object of this invention is to provide an efficient, lightweight, inexpensive converter of power from commercial alternating current to alternating current of any desired frequency.

The objects of this invention are accomplished by a pair of full wave rectifiers, said rectifiers each having electrodes for carrying a heavy current and a control electrode. The current paths of two rectifiers are connected between the alternating current source and the load and are oppositely polarized to admit current of opposite direction of flow to the load so that when the rectifiers are alternately energized current flows in alternate directions through the load. A phase inverter is then provided to generate to out-of-phase, or complementary waveforms, which are employed to alternately enable the rectifiers. The frequency of the alternating enabling voltages is easily controlled by a light-weight oscillator to control the two oppositely polarized direct currents to the load.

Figure 1:
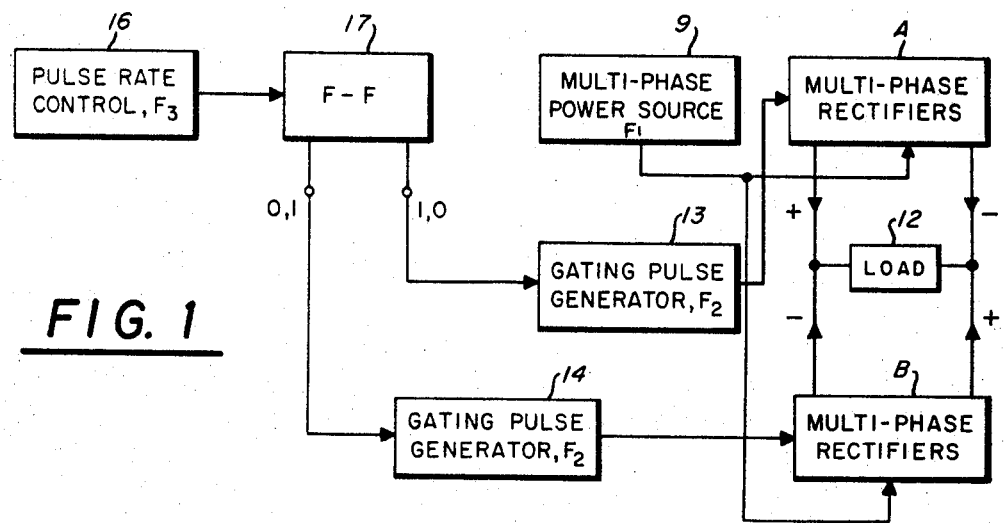
Figure 3:
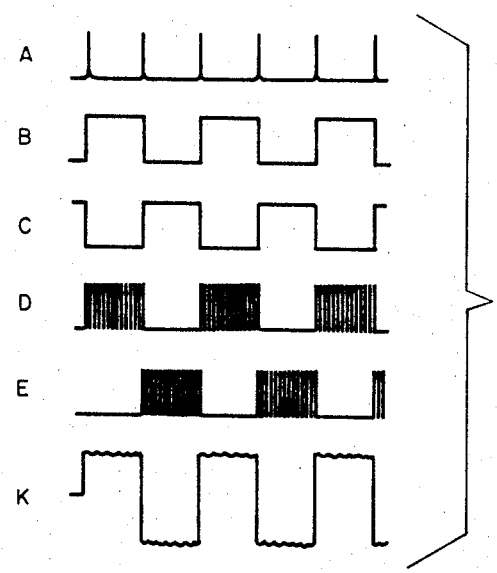
Figure 2:
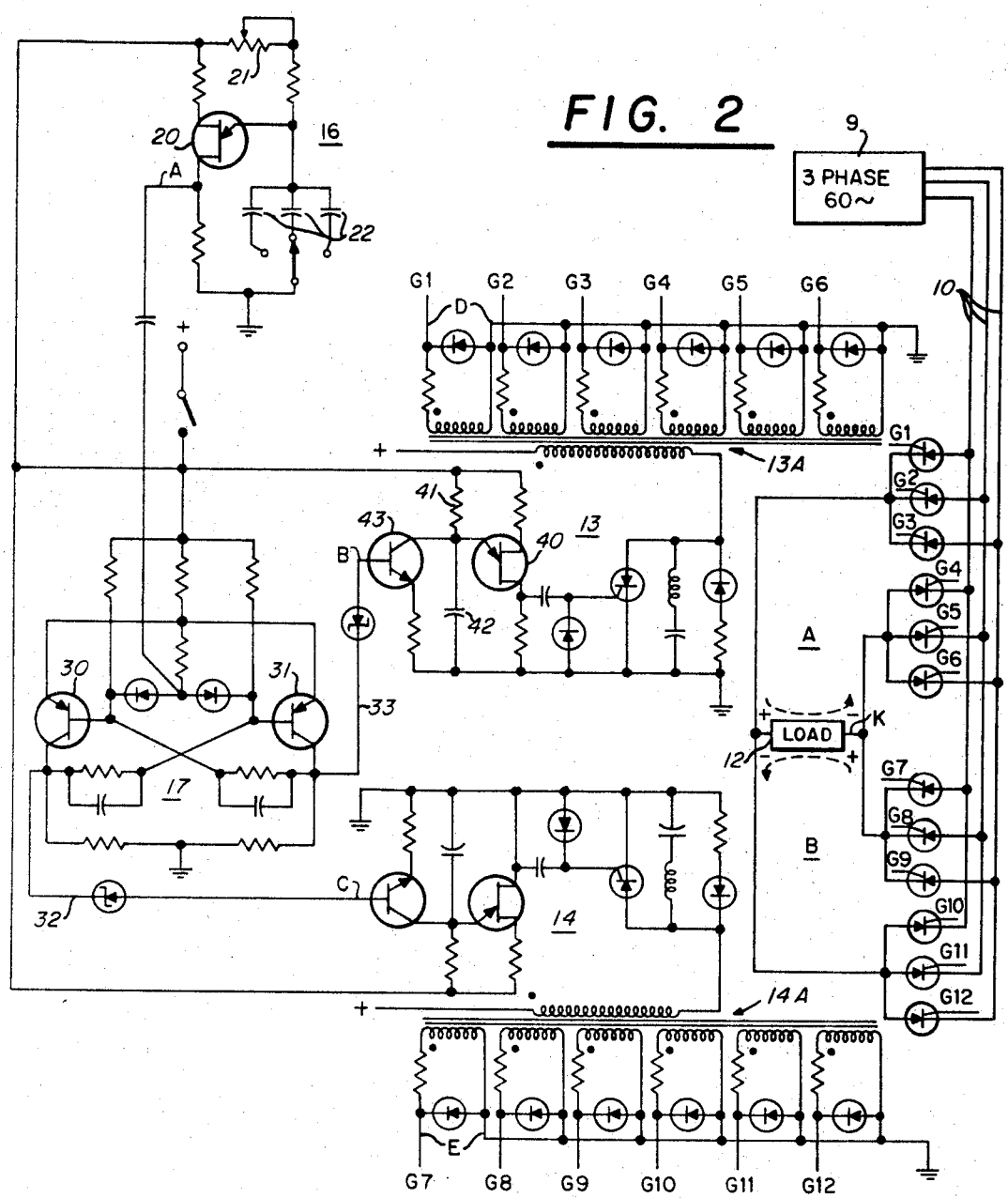

Other objects and features of this invention will become apparent to those skilled in the art by referring to the specific embodiment described in the following specification and shown in the accompanying drawing in which:

FIG. 1 is a block diagram of said embodiment of this invention;
FIG. 2 is a circuit diagram of the embodiment of FIG. 1; and
FIG. 3 shows wave forms taken from FIG. 2.

Referring to FIGS. 1 and 2, single-phase or polyphase power of commercial frequencies and quantities is available at 9 and is applied through power transmission lines 10 to the two rectifier systems A and B. Rectifiers A and B are each full wave rectifiers, preferably, and are connected across the load resistance 12 so that their direct current polarities are opposed. This means that if the rectifiers A and B are enabled alternately, the direct current voltage across the load 12 will simulate a pulsing alternating current wave. The load can, of course, be resistive and/or reactive. To alternately enable rectifiers A and B, gating pulse generators 13 and 14 are connected, respectively, to the rectifiers. The gate pulse generators generate frequencies which are in the radio frequency range or are relatively high compared to all other frequencies in the system. The outputs of the two generators are turned on alternately or are operated complementarily by the two outputs of flip-flop 17 which is driven at any adjustable frequency by the pulse rate control device 16. The frequency range of device 16 extends from zero to the highest frequency ever expected at the load 12. This upper frequency can be several kilocycles per second if the load is a sonar transducer.

Referring now to FIG. 2 where like reference numbers refer to like parts it is seen that the pulse rate control device 16 may comprise a relaxation type oscillator including the unijunction transistor 20 and a resistance-capacitance timing network including resistors 21 and condensers 22. By properly selecting the values of the condensers 22 the frequency of the oscillator may be adjusted in three steps. The three steps in one embodiment were 5 to 30, 15 to 81 and 74 to 385 cycles per second. These frequencies were chosen because of their general application to sonar where considerable amounts of power must be applied to an underwater transmitting transducer. However, as stated there is no general limitation on the upper limits of the rate control device 16.

The output of the generator 16 is applied to the steering circuit of the flip-flop 17 which drives the flip-flop from one stable position to the other once for each pulse from relaxation oscillator 16. For this reason it has been found desirable to operate oscillator 16 at twice the desired output frequency of the system. Transistors 30 and 31 are cross-connected in the usual manner for bistable operation. The two outputs 32 and 33 of flip-flop are alternately and complementarily "high" and "low" and are applied to the multiphase generators 13 and 14, allowing oscillators 13 and 14 to run alternately at their own rate. Generator 13 comprises the unijunction transistor 40 with charging resistor 41 and condenser 42. This oscillator is disable for ½ cycle each cycle by turning on transistor 43 which shorts condenser 42. When transistor 43 is off, 40 will oscillate at the frequency established by the RC time constant of elements 41 and 42, which frequency is preferably relatively high. This means that the generator 13 oscillates at some high frequency only during the time that the flip-flop output 33 is at some predetermined high disabling voltage.

Generator 14 may be identical to generator 13, comprising a similar unijunction oscillator and amplifier. The amplifier is alternately driven to cut-off and conduction by the output 32 of the flip-flop 17. It is important to note that the two generators 13 and 14 operate alternately; one oscillates at a high frequency while the other is completely idle. For convenience, reference will be made here to one frequency which was effectively used in oscillators 13 and 14. Where a heavy 100-kilowatt transducer was to be driven it was found convenient to operate oscillators 13 and 14 at 3300 pulses per second. It will be convenient to refer to this frequency (generators 13 and 14) as $F_2$. The power source 9 will have frequency $F_1$, usually 60 cycles per second, and the rate of 16 will be $F_3$. $F_2$ should be at least 5 to 10 times greater than $F_1$. It will be assumed that the primary power source 9 is three phase alternating current of commercial frequency and that the power is received over the three lines 10, FIG. 2. In this case the load 12 is shown connected across the three pairs of conductors of the power source through six pairs of rectifiers. The rectifiers shown in groups A and B are preferably of the silicon controlled rectifier types comprising a diode current path capable of conducting without overheating current of the order of 400 amperes. Control electrodes G1–G6 control the rectifiers of group A whereas control electrodes G7 to G12 control the conductivity of rectifiers B. Now, if the output of oscillator 13 is coupled through the multiple windings of transformer 13A to the control electrodes G1–G6, full wave rectification will result and current will flow from left to right through load 12. If however, oscillator 14 is operative, control electrodes G7 to G12 are enabled through the multiple windings of transformer 14A, full wave rectification will result and current will flow, now, from right to left through load 12. That is, each time rectifiers of one group shut off and the rectifiers of the other group are enabled the direction of current through the load will reverse.

The operation of FIG. 2 may best be reviewed by observing the waveforms, A to K, shown in FIG. 3. Waveform A at the output of oscillator 16 will generate pulses of frequency 2F where 2F is the frequency determined by the RC circuit 21–22 of the oscillator. This results in the complementary square waves of B and C at the two output terminals of flip-flop 17 which alternately turn off high frequency generators 13 and 14 to produce the pulse groups D and E. Finally the current through the load is substantially rectangular, shown at K, and comprises flat topped binary voltages with ripples. The ripples correspond to the frequency of the generators 13 or 14. It is significant that there need be no synchronism between the frequencies $f$ of the generator 16, of the high pulse rate generators 13 or 14, or the commercial frequency of the power source. By making the pulse rate of generators 13 and 14 relatively high compared to either of the other frequencies, the wavelength of those generators become negligibly short and it results that it is immaterial when the switching operation takes place. It follows that all phase controls can be eliminated and that the power of wave K measured at kilowatts may be precisely controlled by the relatively small relaxation oscillator 16. The output wave may be made sinusoidal or less rectangular by simple filtering techniques without serious loss of power.

Many modifications may be made in the details of the oscillators and generators of the embodiment shown without departing from the spirit or scope of the appended claims.

What is claimed is:

1. A variable frequency power source comprising;

a pair of conductors for connection to a primary alternating current source, a pair of rectifiers, said rectifiers each having electrodes defining a controllable current path, and a control electrode, the current paths of said rectifiers being connected between said conductors and said load, and being oppositely polarized to admit current of opposite directions of flow to said load, a pair of generators of a frequency which is relatively high compared to said primary source, the output circuits of said generators being coupled, respectively, to the control electrodes of said rectifiers for applying enabling voltages to said rectifiers, means for alternately disabling said generators for, in turn, enabling alternate set of rectifiers to generate alternating current in said load, said means for alternately enabling said generators comprising a flip-flop with two complementary binary output terminals coupled, respectively, to said generators, the binary voltages of said output terminals being ample in magnitude to drive said generators between cut-off and conduction, an oscillator, means for changing the frequency of oscillation of said oscillator, and a coupling circuit coupled between said oscillator and said flip-flop for periodically reversing the stable state of said flip-flop.

2. The power source defined in claim 1 further comprising;

a plurality of pairs of conductors for connection to a polyphase alternating current source, a plurality of groups of rectifiers coupled between said load and said conductors the rectifiers in each group connected in pairs for full wave rectification, and the control electrodes of the rectifiers of each group being coupled to the output of one of said relatively high frequency generators.

References Cited

UNITED STATES PATENTS

| 2,848,616 | 8/1958 | Tollefson | 331—55 X |
| 3,176,211 | 3/1965 | Linn | 321—5 |
| 3,256,244 | 6/1966 | Byloff et al. | 321—61 |
| 3,355,647 | 11/1967 | Braus | 321—61 X |

JOHN F. COUCH, *Primary Examiner.*

G. GOLDBERG, *Assistant Examiner.*

U.S. Cl. X.R.

307—271, 295; 331—2, 47, 50, 55